United States Patent [19]

Benuzzi et al.

[11] Patent Number: 4,819,532
[45] Date of Patent: Apr. 11, 1989

[54] SAWING MACHINE

[76] Inventors: deceased Benuzzi, late of Bologna, Italy; by Piergiorgio Benuzzi, heir-at-law, 5 Via Angelo Custode, Bologna, Italy

[21] Appl. No.: 861,396

[22] Filed: May 9, 1986

[30] Foreign Application Priority Data

May 10, 1985 [IT] Italy .................. 15170/85[U]

[51] Int. Cl.$^4$ .............................................. B27B 5/06
[52] U.S. Cl. ....................................... 83/100; 83/458; 83/460; 83/477.2; 83/485
[58] Field of Search ............... 83/100, 458, 466.1, 83/455, 460, 614, 485, 477.2, 487, 488

[56] References Cited

U.S. PATENT DOCUMENTS

| | | |
|---|---|---|
| 326,916 | 9/1885 | Morse, Jr. .................. 83/458 |
| 2,987,085 | 6/1961 | Porter .................. 83/100 |
| 3,721,140 | 3/1973 | Campbell .................. 83/102 |
| 4,018,118 | 4/1977 | Goff .................. 83/488 X |
| 4,214,493 | 7/1980 | Elhaus .................. 83/100 |
| 4,364,291 | 12/1982 | Jenkner .................. 83/477.2 X |

Primary Examiner—Frank T. Yost
Attorney, Agent, or Firm—Pollock, Vande Sande & Priddy

[57] ABSTRACT

A sawing machine for cutting workpieces such as panels or packs of panels (P) comprises a horizontal workpiece support table (A) having a straight longitudinal slot (L) defining a cutting line, a sawing tool (S) movable along the cutting line and a longitudinal pressure device arranged above the workpiece support table and extending along the entire length of the cutting line. The pressure device consists of two pressure beams (1, 1') arranged at both sides of the cutting line, parallel thereto. Each beam can be raised and lowered independently of the other in relation to the workpiece support table in order to clamp thereon the workpiece to be sawed or to contact the surface of the support table. An auxiliary beam (21) is arranged between the two pressure beams (1, 1') parallelly and fixed with respect thereto, and has at its bottom, on both sides facing the two pressure beams (1, 1') a longitudinal sealing element (23) extending for the entire length of the auxiliary beam and contacting the inner faces of the pressure beams (1, 1') so as to form a duct (C) along which the sawing tool (S) is moved, and which is connected to a suitable suction source (22) for removing saw dust.

3 Claims, 4 Drawing Sheets

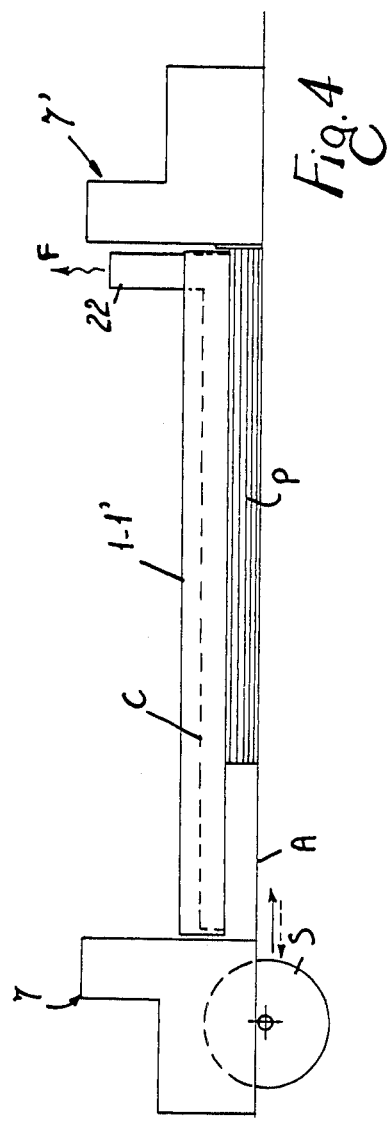
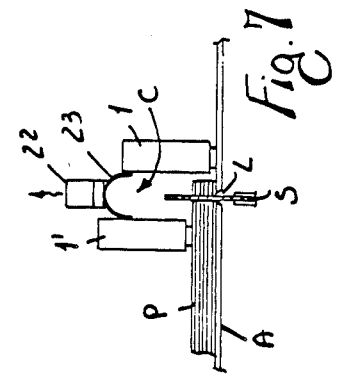
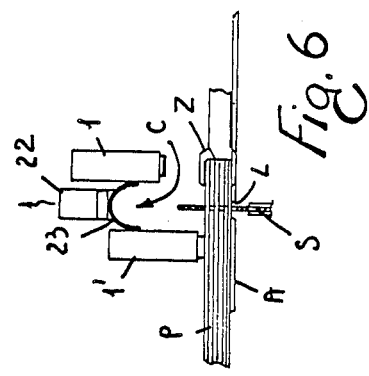
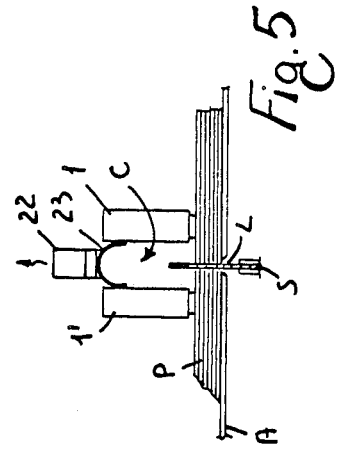

SAWING MACHINE

SUMMARY OF THE INVENTION

The present invention relates to a sawing machine for cutting workpieces such as panels or packs of panels, of the type comprising a horizontal workpiece support table having a straight longitudinal slot defining a cutting line, a sawing tool movable along the cutting line and a longitudinal pressure device arranged above the workpiece support table and extending along the entire length of the cutting line. According to a first aspect of the invention, the pressure device consists of two pressure beams arranged at both sides of the cutting line, parallel thereto, means being provided for raising and lowering each pressure beam independently of the other, so as to raise and lower it with respect to the workpiece support table in order to clamp thereon the workpiece to be sawed or to contact the surface of said support table.

According to a second aspect of the invention, an auxiliary beam is arranged between the two pressure beams parallelly thereto and fixed with respect thereto, said auxiliary beam presenting at its bottom, at both sides facing the two pressure beams, a longitudinal sealing element extending for the entire length of the said auxiliary beam and contacting the inner faces of the pressure beams in such a manner as to form a duct along which the sawing tool is moved, said duct being connected to a suitable suction source for removing the saw dust resulting from the sawing operation. Preferably, the sealing element is a continuous sealing strip having in section an interval "U" shape and in which the free ends of the sealing strip corresponding to the legs of the inverted "U" are in sealing contact with the inner faces of the vertically movable pressure beams.

BRIEF DESCRIPTION OF THE DRAWINGS

The above and other features of the invention, and the advantages deriving therefrom, will appear evident from the following description of a preferred embodiment, made with reference to the attached drawings, in which:

FIG. 4 is a diagrammatic front elevation view of the pressure device during its operation.

FIGS. 5, 6, 7 and 8 are side elevation views diagrammatically showing different modes of operation of the pressure device.

DESCRIPTION OF THE PREFERRED EMBODIMENT

Figure 1:
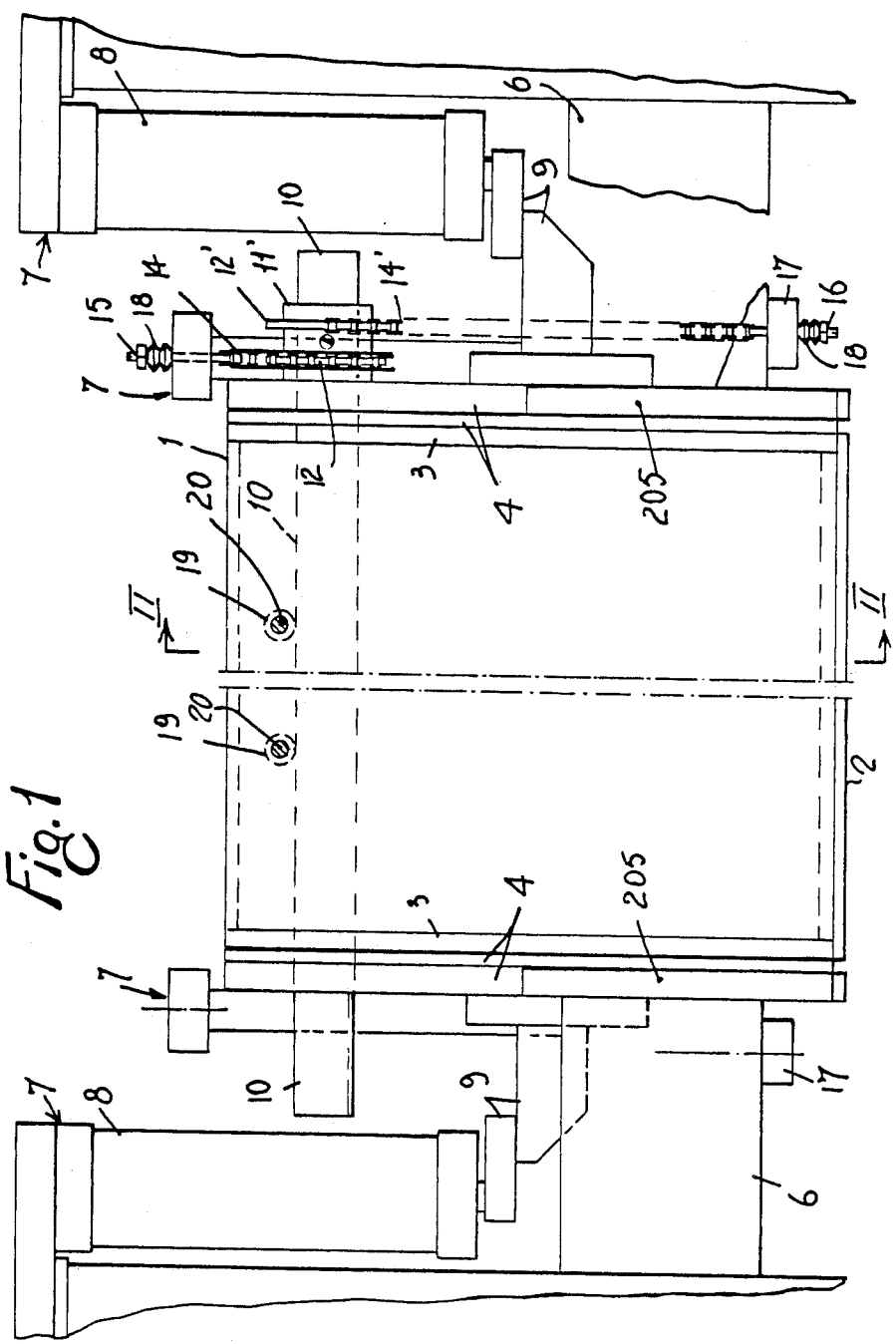
FIG. 1 is a front elevation view of the pressure device in its raised position.

As shown in FIG. 5, horizontal workpiece support table A of the sawing machine, is provided with a rectilinear slot L defining a cutting line along which there is moved at least one disk saw S, protruding therefrom, which cuts the pack of panels P positioned on the workpiece support table A. At both sides of the cutting line (upstream and downstream with respect to the direction of movement of the panels P), there are provided at positions equidistant therefrom and parallel thereto, two identical hollow metal beams 1, 1' which are rectangular in section and are arranged in such a manner that one of their faces with smaller area is turned downward and is positioned parallel to the table A, respective strips 2, 2' of any suitable, sufficiently elastic and yielding material being attached to said lower faces.

At their ends, the beams 1, 1' are closed by respective plates 3 which are fastened to slides 4, 4' cooperating with vertical guides 5, 105, 205, and 5', 105', and 205' which, through supports 6, 6' are in turn secured to the adjoining frames 7, 7' provided at the ends of the cutting line.

Fluid pressure operated, double-acting cylinder and piston units 8, 8' are secured by their bodies to said frames, one for each end of the beams 1, 1', said units having their stems directed downwardly and secured to supports 9, 9' which are in their turn secured to slides 4, 4'. Each pair of units 8, 8' is fed through a respective circuit, so that it will be possible to move the pressure beams 1, 1' independently of each other.

In order to ensure that the raising and lowering of the beams 1, 1' takes place under conditions of constant parallelism, the following arrangement has been provided, which will be described only in connection with beam 1, since the arrangement for beam 1' is identical.

Figure 2:
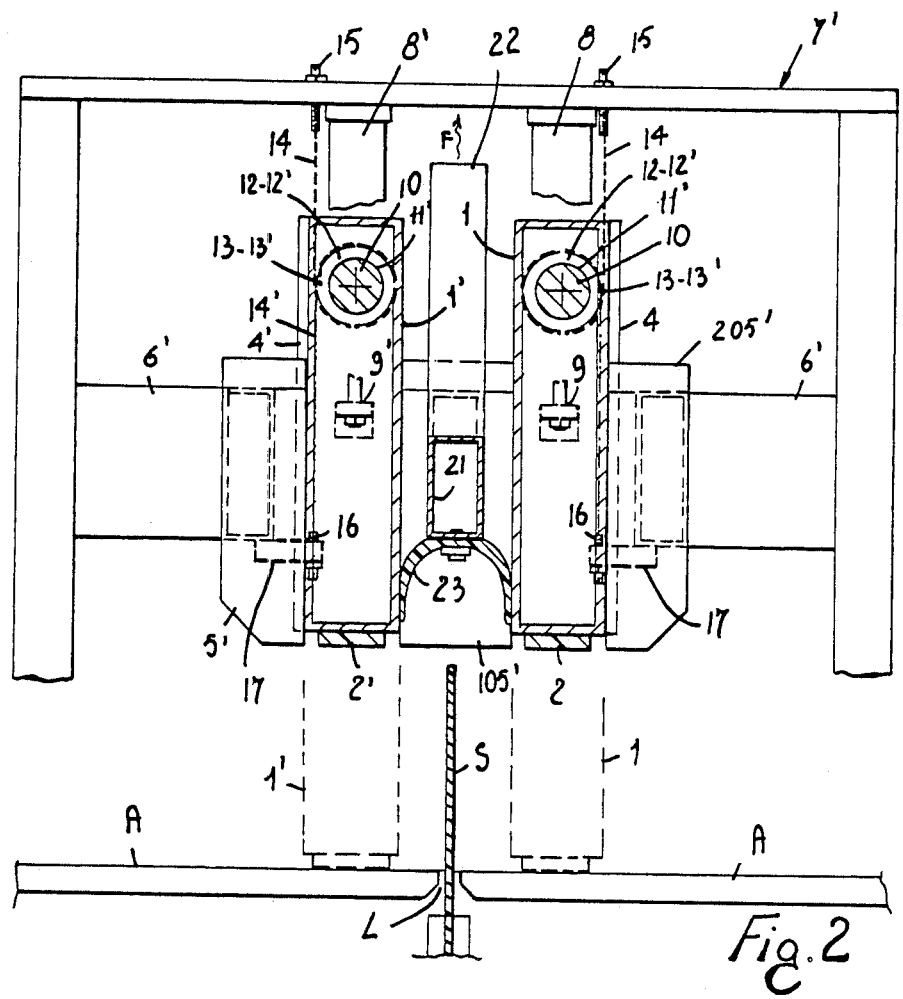
FIG. 2 is a section view of the pressure device, in along line II—II of FIG. 1.
Figure 3:
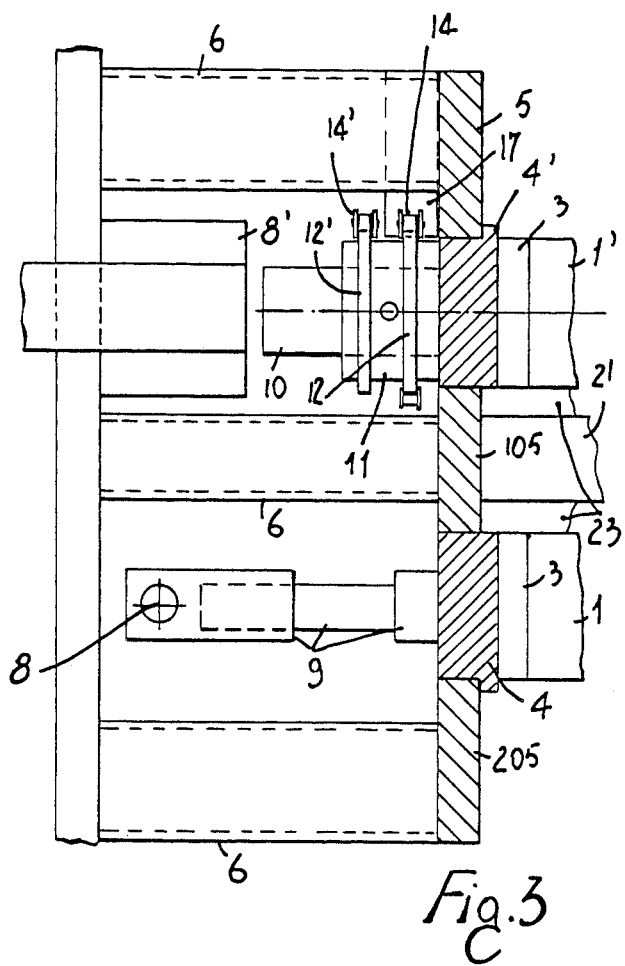
FIG. 3 is a top plan view, with parts in section, of one of the ends of the pressure device.

Above the supports 9, from the slides 4, 4' there project the ends of a shaft 10 which in median position is longitudinally passed through the beam 1, and is rotatable therein. On the ends of shaft 10 there are keyed the bushings 11, 11' which are identical and are each provided with two coaxial annular projections or collars 12, 12' of the same diameter. The ends of two stretches of roller chains 14, 14' with their rollers being capable to bear on the collars 12, 12' are fastened thereto, at points 13, 13' which are close to each other and aligned horizontally. When the pressure device is in its rest position, as shown in FIG. 2, the chain 14 is wound completely around the collar 12, and its remaining length, properly tensioned, is arranged vertically and is anchored to an adjusting screw 15 mounted onto a support secured to frame 7. The chain 14' is instead entirely unwound, is vertically directed downwardly and by its other end is connected to an adjusting screw 16 mounted on a support 17 which is also secured to frame 7. Whenever the piston and cylinder units 8 are actuated for the downward travel of beam 1, the chains 14 are unwound from the collars 12 of bushings 11, 11', and at the same time the chains 14' are wound around the collars 12', with the result that the beam 1 is moved constantly under a condition of parallelism with respect to the underlying table A. The small slacks which over time may arise in the chains 14, 14' can easily be compensated by means of the adjusting screws 15, 16, or automatically by elastic means suitably interposed between the screws and the respective supports, as diagrammatically shown by reference numeral 18 in FIG. 1.

To prevent abnormal flexion loading of shaft 10, symmetrically arranged intermediate portions of this shaft operate in contact with bushings 19 on screws 20 secured transverse inside beams 1, 1'.

A small auxiliary beam 21 is provided between the beams 1, 1' parallel thereto and equidistant therefrom, said auxiliary beam 21 being secured by its ends to the guides 105, 105', at one end directly, and at the other end with the interposition of a vertical duct 22 which opens by one end at the level of the lower side of said auxiliary beam, while its other end is connected to a suitable suction circuit, as diagrammatically shown by arrow F in FIG. 4. On the lower side or face of the auxiliary beam 21 there is longitudinally fastened a continuous strip 23 of flexible material such as, for example, synthetic rubber, which has in cross section an inverted "U" profile and which by its edges contacts the inner vertical sides or faces of the pressure beams 1, 1'. As shown by dash lines in FIG. 2, both pressure beams 1, 1' can be lowered by such an amount so to touch the workpiece support table A when no workpiece is present thereon, and also in this condition the beams 1, 1' remain with their inner sides in contact with the edges of the sealing strip 23, thus ensuring structural continuity with said duct C.

Figure 8:
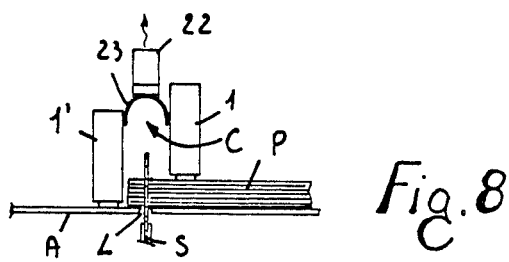

The pressure device according to the invention operates as follows:

The normal mode operation is shown in FIG. 5, where both the independent pressure beams 1, 1' bear on the top surface of the pack of panels P which is being cut by the saw S. The saw dust formed during the cutting operation is collected in duct C and is ejected through duct 22. When the pack P is to be trimmed at one edge, or is subjected to an operation in which it does not present any portion under one of the two beams 1, 1', as shown in FIGS. 7 and 8, the beam which does not meet the pack P is lowered until it touches the table A, so as to laterally close the duct C and to ensure also under this condition the utmost safety in the operation of the machine, and the complete removal of the dust resulting from the sawing operation. According to another mode of operation, shown in FIG. 6, whenever under one of the pressure beam, for example beam 1, there is positioned the end of a pack P which is clamped by grippers Z which move the pack forward, it is possible to block the pack A by means of the beam 1', then to withdraw the grippers Z and lower also the beam 1, or even to leave the grippers Z in position if they do not interfere with the saw S cutting the panels, and lower the beam 1 without exerting any pressure, for the sole purpose of laterally closing the suction duct C. These different possibilities of operating the beams 1, 1' are available because the two beams are independent of each other, and suitable control means will be required for the sequential operation of the cylinder and piston units 8, 8'.

It is claimed:

1. A sawing machine for cutting workpieces such as panels or packs of panels (P), of the type comprising a horizontal workpiece support table (A) having a straight longitudinal slot (L) defining a cutting line, a sawing tool (S) movable along said cutting line and a longitudinal pressure device arranged above said workpiece support table and extending along the entire length of said cutting line, wherein said pressure device consists of two pressure beams (1, 1') arranged at both sides of said cutting line, parallel thereto, and comprising means for raising and lowering each pressure beam (1, 1') independently of the other, and an auxiliary beam (21) arranged between said two pressure beams (1, 1') parallel thereto and fixed with respect thereto, said auxiliary beam having on its bottom, at both sides facing said two pressure beams (1, 1') a longitudinal sealing element (23) extending for the entire length of said auxiliary beam and contacting said inner faces of said pressure beams (1, 1') in such a manner as to form a duct (C) along which said sawing tool (S) is moved, said duct (C) being connected to a suction source (22) for removing saw dust.

2. A sawing machine according to claim 1, wherein said sealing element (23) is a continuous sealing strip having in section an inverted "U" shape, free ends of said sealing strip corresponding to the legs of the inverted "U" being in sealing contact with said inner faces of said pressure beams (1, 1').

3. A sawing machine according to claim 1, wherein said means for raising and lowering each pressure beam independently of the other comprise fluid operated double-acting cylinder and piston units (8, 8') having one end secured to a fixed frame (7) and the other to the pressure beam, while each pressure beam 91, 1') supports in a rotatable manner a longitudinal shaft (10) at the ends of which are keyed bushings (11—11') onto each of which are anchored and wound in opposite phase relationship a pair of flexible elements such as roller chains (14, 14'), anchored under tension to support members (15, 16) fixedly secured to said fixed frame (7), one support member being located above and the other below said longitudinal shaft (10).

* * * * *